United States Patent
Suto et al.

(10) Patent No.: US 8,960,072 B2
(45) Date of Patent: Feb. 24, 2015

(54) MULTILAYER LUBRICATION COATING FILM AND INTERNAL COMBUSTION ENGINE PISTON USING THE COATING FILM

(75) Inventors: Kenji Suto, Wako (JP); Kota Tokubi, Wako (JP); Tomonori Saito, Wako (JP); Yoshimi Kuroda, Inabe (JP)

(73) Assignee: Honda Motor Co., Ltd, Tokyo (JP)

( * ) Notice: Subject to any disclaimer, the term of this patent is extended or adjusted under 35 U.S.C. 154(b) by 841 days.

(21) Appl. No.: 13/017,689

(22) Filed: Jan. 31, 2011

(65) Prior Publication Data

US 2011/0192279 A1  Aug. 11, 2011

(30) Foreign Application Priority Data

Feb. 9, 2010  (JP) .................................. 2010-026909

(51) Int. Cl.
*F16J 1/08*  (2006.01)
*F16J 1/01*  (2006.01)

(52) U.S. Cl.
CPC ...... *F16J 1/01* (2013.01); *F16J 1/08* (2013.01)
USPC ............................ 92/155; 92/223; 29/888.048

(58) Field of Classification Search
CPC ....................................... F16J 1/01; F16J 1/08
USPC .................... 92/155, 222, 223; 123/193.6; 29/888.048; 428/418, 626
See application file for complete search history.

(56) References Cited

U.S. PATENT DOCUMENTS

| | | | | |
|---|---|---|---|---|
| 1,717,750 A | * | 6/1929 | Wills | 428/573 |
| 3,716,348 A | * | 2/1973 | Perkins | 428/626 |
| 5,129,378 A | * | 7/1992 | Donahue et al. | 123/193.4 |
| 5,223,052 A | * | 6/1993 | Yamamoto et al. | 148/587 |
| 5,884,600 A | * | 3/1999 | Wang et al. | 123/193.6 |
| 6,189,434 B1 | * | 2/2001 | Kawaguchi et al. | 92/71 |
| 6,827,996 B2 | * | 12/2004 | Goto | 428/36.9 |
| 7,156,014 B2 | * | 1/2007 | Sugioka et al. | 92/155 |
| 7,377,206 B2 | * | 5/2008 | Douglas | 92/223 |
| 7,559,306 B2 | * | 7/2009 | Kuroda et al. | 123/193.6 |
| 7,721,642 B2 | * | 5/2010 | Sugioka et al. | 92/155 |
| 2002/0153210 A1 | * | 10/2002 | Kurita et al. | 188/200 |
| 2009/0236850 A1 | * | 9/2009 | Goto et al. | 285/333 |
| 2010/0240558 A1 | * | 9/2010 | Wang | 508/108 |

FOREIGN PATENT DOCUMENTS

| | | | |
|---|---|---|---|
| CN | 2660144 Y | | 12/2004 |
| JP | 63282915 A | * | 11/1988 |
| JP | 2002260361 A | * | 9/2002 |
| JP | 2008-056750 A | | 3/2008 |
| JP | 2008056750 A | * | 3/2008 |

* cited by examiner

*Primary Examiner* — Dwayne J White
*Assistant Examiner* — Logan Kraft
(74) *Attorney, Agent, or Firm* — Westerman, Hattori, Daniels & Adrian, LLP

(57) ABSTRACT

A multilayer lubrication coating film is formed on the outer surface of an object to be coated. The multilayer lubrication coating film comprises a lower-layer coating film formed on an outer surface of the object to be coated, and an upper-layer coating film formed on a surface of the lower-layer coating film. The lower-layer coating film has a higher Vickers hardness than the Vickers hardness of the object to be coated.

2 Claims, 3 Drawing Sheets

FIG.1
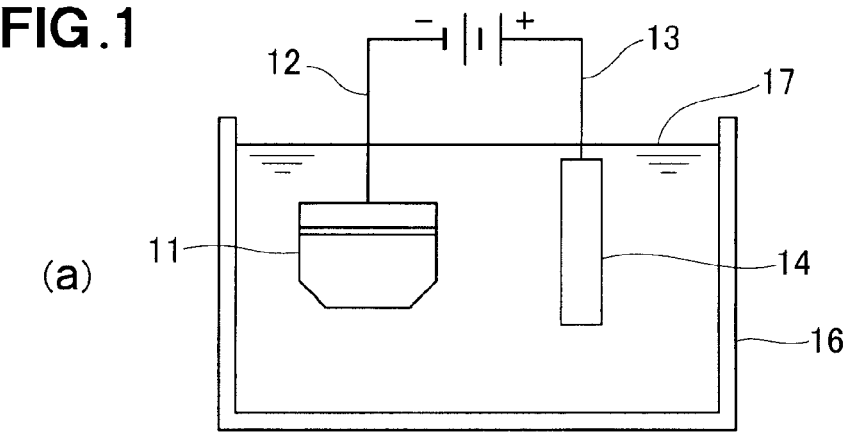
(a)
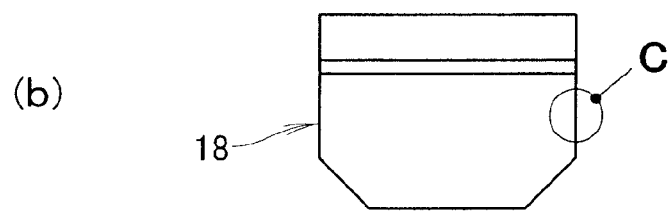
(b)
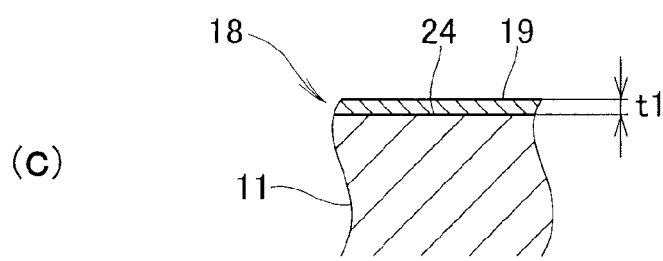
(c)
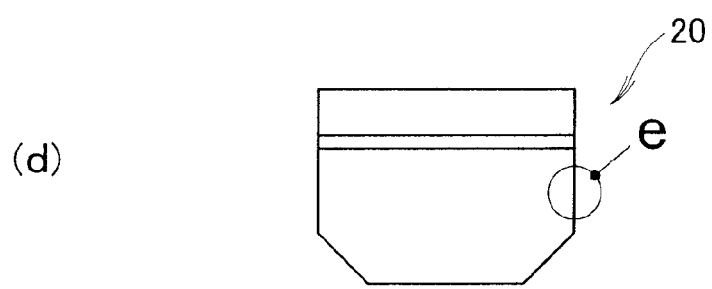
(d)
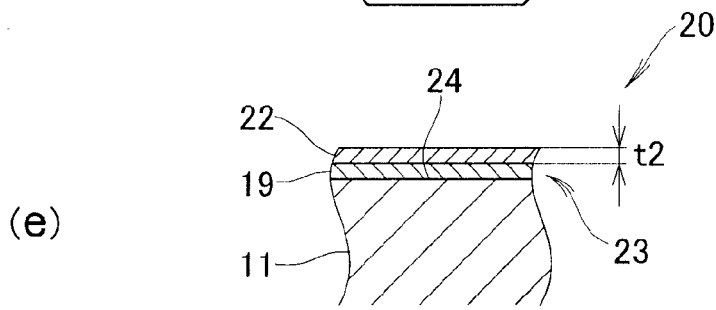
(e)

FIG. 3
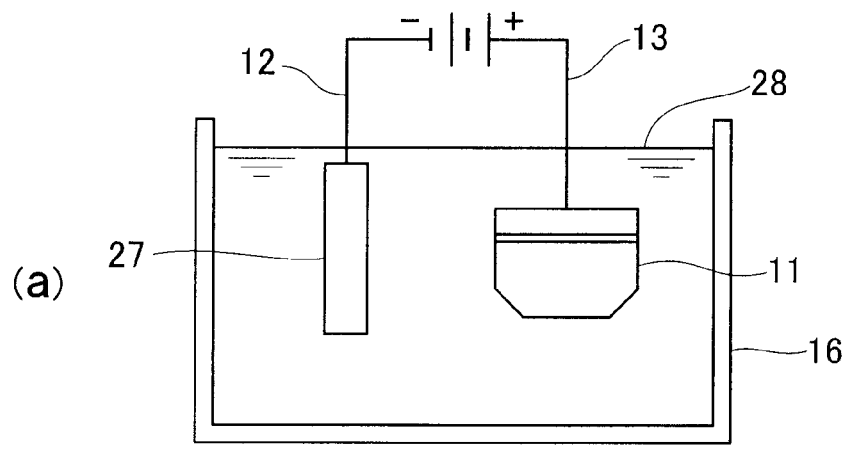
(a)
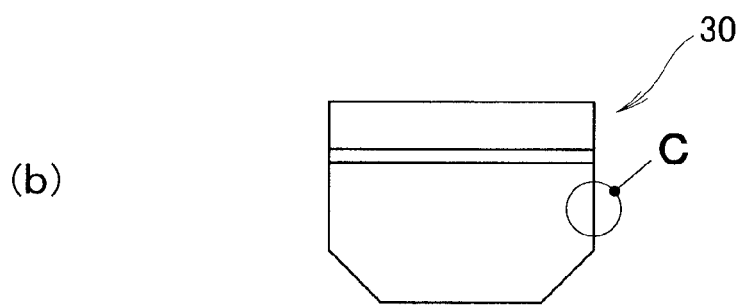
(b)
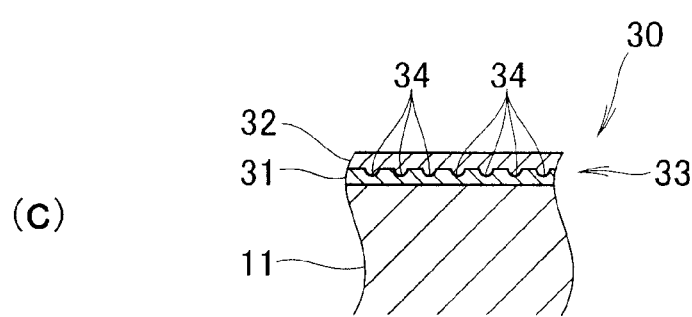
(c)

MULTILAYER LUBRICATION COATING FILM AND INTERNAL COMBUSTION ENGINE PISTON USING THE COATING FILM

FIELD OF THE INVENTION

The present invention relates to a multilayer lubrication coating composition which is advantageous for a piston made of an aluminum alloy in an internal combustion engine.

BACKGROUND OF THE INVENTION

The skirt of a piston unavoidably contacts the inside of a cylinder sleeve of an internal combustion engine. Therefore, improvement in the abrasion resistance and scorching resistance of the outer surface of a piston is sought. Japanese Patent Application Laid-Open Publication No. 2008-56750 (JP 2008-56750 A) has disclosed a remedial measure with this object.

JP 2008-56750 A discloses a multilayer lubrication coating composition comprising an upper-layer coating composition and a lower-layer coating composition, wherein the upper-layer coating composition comprises 50 to 70 wt % of at least one of an epoxy resin and a polyamide-imide resin as a bonding resin; 5 to 20 wt % of boron nitride as a solid lubricant; and 15 to 30 wt % of at least one of silicon nitride and alumina as hard particles; and the lower-layer coating composition comprises 50 to 70 wt % of at least one of an epoxy resin and a polyamide-imide resin as bonding resins; 15 to 30 wt % of polytetrafluoroethylene as a solid lubricant; and 5 to 20 wt % of molybdenum disulfide. This coating composition can improve abrasion resistance and scorching resistance through the action of a solid lubricant, such as molybdenum disulfide.

A multilayer lubrication coating composition of this configuration achieves abrasion resistance and scorching resistance provided that it is sound.

Depending on the type and operating environment of an engine, however, foreign matter, such as sand, may be mixed into a lubricating oil. This is a concern when using a general-purpose engine without a filter with the object of lower cost, or when running a general-purpose engine in a sandstorm.

When foreign matter is mixed into a lubricating oil, this foreign matter becomes a grinding material, which damages the multilayer lubrication coating composition and exposes the aluminum substrate. When this happens, abrasion and scorching progress and cause the problem of shortening the life of the piston. In the case that the contact pressure between a piston and a cylinder sleeve is greater than a permissible pressure, this pressure damages the multilayer lubrication coating composition, exposes the aluminum substrate, and causes a similar problem.

Therefore, there is a need for a technology capable of extending the life of a metal part coated by a multilayer lubrication coating composition even when this multilayer lubrication coating composition is damaged.

SUMMARY OF THE INVENTION

The problem addressed by the present invention is to provide a technology capable of extending the life of a metal part coated by a multilayer lubrication coating composition even when this multilayer lubrication coating composition is damaged.

According to a first aspect of the present invention, there is provided a multilayer lubrication coating film to be formed on an outer surface of an object to be coated, which film comprises a lower-layer coating film formed on the outer surface of an object to be coated and an upper-layer coating film formed on a surface of the lower-layer coating film, the upper-layer coating film being formed using a composition made of 50 to 70 mass % of at least one of an epoxy resin and a polyamide-imide resin as bonding resins; 5 to 20 mass % of boron nitride as a solid lubricant; and 15 to 30 mass % of at least one of silicon nitride and alumina as hard particles; and the lower-layer coating film having a higher Vickers hardness than the Vickers hardness of the object to be coated.

Therefore, the lower-layer coating film having a high Vickers hardness resists damage. The lower-layer coating film resisting damage prevents exposing the object to be coated. Preventing exposure can increase the lifespan of a coated metal part.

It is preferred that the object to be coated is made of an aluminum alloy, and the lower-layer coating film be one from among a plated film and an anodized film. Therefore, the lower-layer coating film comprising either a plated film or an anodized film adheres firmly to an aluminum alloy. Adhering firmly to an aluminum alloy can also prevent exposing the object to be coated, and can increase the lifespan of a metal part coated using the multilayer lubrication coating composition.

According to another aspect of the present invention, there is provided a piston of an internal combustion engine, having a multilayer lubrication coating film formed on an outer peripheral surface, the multilayer lubrication coating film having a lower-layer coating film formed on the outer peripheral surface of the piston and an upper-layer coating film formed on a surface of the lower-layer coating film, the upper-layer coating film being formed using a composition made of 50 to 70 mass % of at least one of an epoxy resin and a polyamide-imide resin as bonding resins; 5 to 20 mass % of boron nitride as a solid lubricant; and 15 to 30 mass % of at least one of silicon nitride and alumina as hard particles, and the lower-layer coating film having a higher Vickers hardness than the Vickers hardness of the piston.

Because the multilayer lubrication coating thus resists damage, the piston coated by the multilayer lubrication coating film also resists damage. When a piston with such resistance to damage is mounted in an internal combustion engine, the internal combustion engine can be advantageously used in a variety of environments.

BRIEF DESCRIPTION OF THE DRAWINGS

Certain preferred embodiments of the present invention will be described in detail below, by way of example only, with reference to the accompanying drawings, in which:

FIGS. 1(a)-(e) are views illustrating a method for manufacturing a piston according to a first embodiment of the present invention;

FIGS. 3(a)-(c) are views illustrating a method for manufacturing a piston according to a second embodiment of the present invention.

DETAILED DESCRIPTION OF THE PREFERRED EMBODIMENTS

First Embodiment

Figure 2:
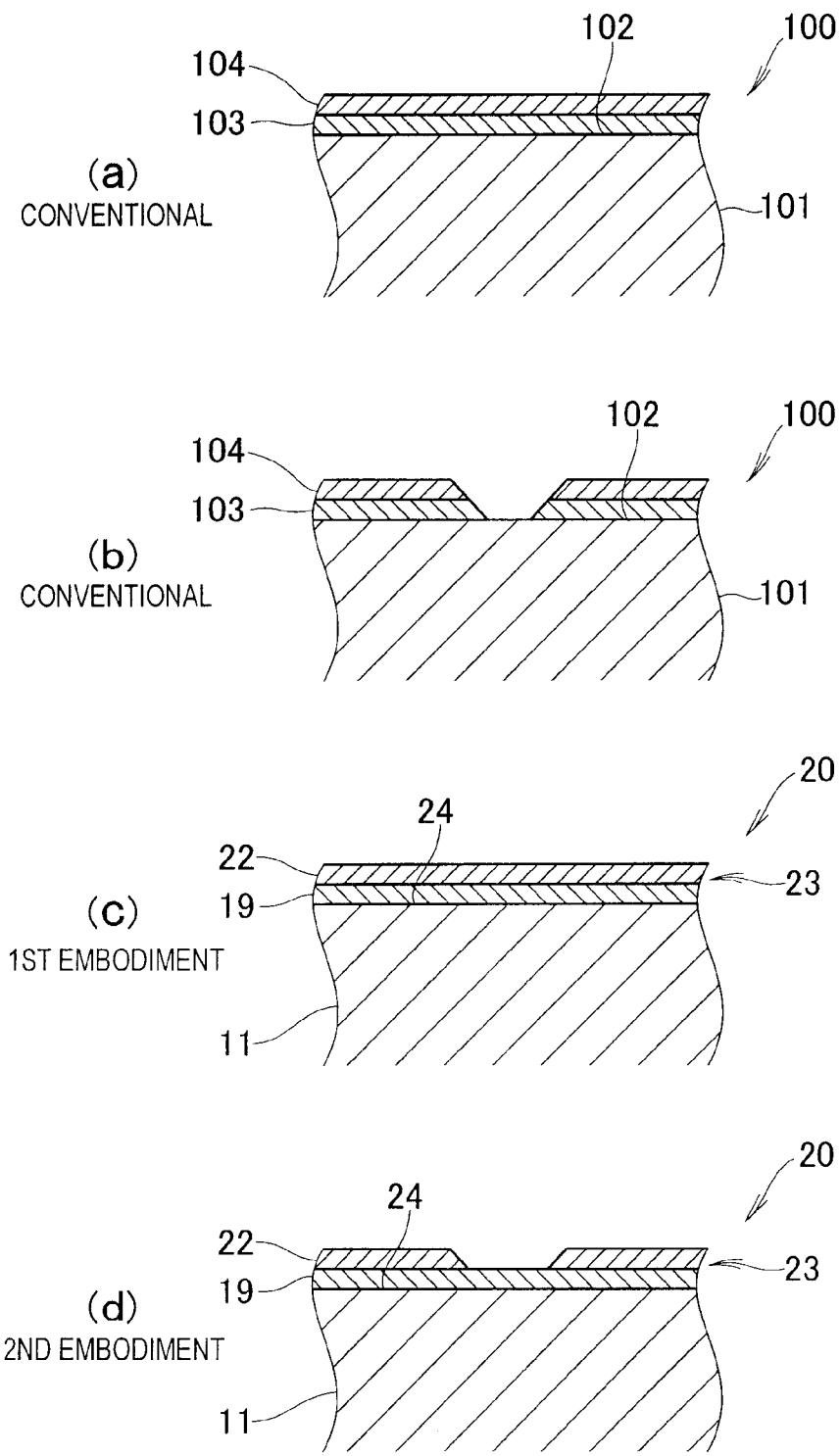
FIGS. 2(a)-(d) are views showing a comparison between the embodiment and a comparative example.

First, a first embodiment of the present invention will be described with reference to the accompanying drawings.

First, an object to be coated 11 made of an aluminum alloy is plated with iron as shown in FIG. 1(a).

Specifically, the object to be coated 11 is connected to a cathode 12, an iron (Fe) plate 14 is connected to an anode 13, and these components are immersed in an electrolytic solution 17 inside a tank 16. A current is charged and the object to be coated 11 is iron-plated while immersed in the electrolytic solution 17.

For example, the electrolytic solution 17 is a mixture of 300 g/L of ferrous chloride ($FeCl_2$) and 20 g/L of ammonium chloride ($NH_4Cl$). The temperature of the electrolytic solution 17 is 50° C. and the cathode current density is 6 A/dm$^2$ during iron plating.

Before plating, the surface of the object to be coated 11 is preferably pretreated such as by degreasing or removing oxide film. Pretreating further raises the adhesion of an iron plating film 19 (FIG. 1(c)) to the object to be coated 11.

Iron-plating the object to be coated 11 can give a semi-finished part 18 such as shown in FIG. 1(b). As shown in FIG. 1(c), which is an expanded view of a region c of the semi-finished part 18, plating with iron covers the surface of the object to be coated 11 by an iron plating film 19 as a lower-layer coating film.

The iron plating film 19 has a thickness t1 of 20 μm, for example. This thickness t1 can be adjusted by modifying the conditions of the plating treatment shown in FIG. 1(a). The thickness t1 may be in a range of 5 μm to 30 μm.

The iron plating film 19 has a Vickers hardness of Hv 400 to 500.

An aluminum-silicon (Al—Si) alloy, which is one type of an aluminum alloy, is used in pistons and other metal parts. This Al—Si alloy has a Vickers hardness of Hv 70 to 140. That is, the Vickers hardness of the iron plating film 19, which is the lower-layer coating film, is higher than the Vickers hardness of an aluminum alloy (Al—Si alloy).

Next, an upper-layer coating composition is coated on the surface of the semi-finished part 18.

The mixture ratio of the upper-layer coating composition is 50 to 70 mass % of at least one of epoxy resin (EP) and a polyamide-imide resin (PAI) as bonding resins; 5 to 20 mass % of boron nitride (BN) as a solid lubricant; and 15 to 30 mass % of at least one of silicon nitride ($Si_3N_4$) and alumina ($Al_2O_3$) as hard particles.

For example, a composition is mixed at a ratio of 62.5 mass % of an epoxy resin, 12.5 mass % of boron nitride, and 25.0 mass % of silicon nitride. This mixture is dissolved in an organic solvent, coated on the surface of the semi-finished part 18, and calcined. This procedure gives a piston 20 as a metal part as shown in FIG. 1(d).

As shown in FIG. 1(e), which is an expanded view of a region e of FIG. 1(d), a calcined upper-layer coating film 22 is formed on the surface of the iron plating film 19. A multi-layer lubrication coating film 23 for covering the outer surface 24 of the piston 20 comprises the iron plating film 19 and the upper-layer coating film 22.

The upper-layer coating film 22 has a thickness t2 of 10 μm, for example. The thickness t2 of the upper-layer coating film 22 may be in a range of 5 to 10 μm.

Foreign matter, such as sand, may be mixed into a lubricating oil in a general-purpose engine. Durability against such foreign matter will be described while comparing a piston according to the first embodiment with a conventional piston.

As shown in FIG. 2(a), a conventional piston 100 has a lower-layer coating film 103 and an upper-layer coating film 104 formed on the outer surface 102 of an object to be coated 101 made of an aluminum alloy. The coating composition of both the lower-layer coating film 103 and the upper-layer coating film 104 is a mixture mixed at a ratio of 62.5 mass % of an epoxy resin (EP), 12.5 mass % of boron nitride (BN), and 25.0 mass % of silicon nitride ($Si_3N_4$).

When such a piston 100 is used in an internal combustion engine, foreign matter mixed into a lubricating oil may grind the lower-layer coating film 103 and the upper-layer coating film 104 as shown in FIG. 2(b). Grinding exposes the object to be coated 101, leaving the exposed object to be coated to be ground again by foreign matter.

As shown in FIG. 2(c), the piston 20 according to the first embodiment has a multilayer lubrication coating film 23 formed on the outer surface 24 of the object to be coated 11 made of an aluminum alloy. Of the multilayer lubrication coating film 23, the lower-layer coating film is an iron plating film 19.

The coating composition of the upper-layer coating film 22 is mixed at a ratio of 62.5 mass % of an epoxy resin (EP), 12.5 mass % of boron nitride (BN), and 25.0 mass % of silicon nitride ($Si_3N_4$).

When such a piston 20 is used in an internal combustion engine, as shown in FIG. 2(d), foreign matter mixed into a lubricating oil may grind the upper-layer coating film 22. The iron plating film 19 having a high Vickers hardness, however, resists being ground by foreign matter.

Specifically, the following shall be apparent: The lower-layer coating composition comprises an iron plating film 19 (lower-layer coating film) having a higher Vickers hardness than the Vickers hardness of the object to be coated 11. The iron plating film 19 having a high Vickers hardness resists damage. By resisting damage, the iron plating film 19 tends to prevent exposing the object to be coated 11. Preventing exposure of the object to be coated 11 can increase the lifespan of the piston 20 (metal part) covered by the multilayer lubrication coating film 23.

In addition, the object to be coated 11 is an aluminum alloy and the lower-layer coating film is the iron plating film 19. The lower-layer coating film comprising the iron plating film 19 adheres firmly to the aluminum alloy forming the object to be coated 11. Adhering firmly to the aluminum alloy can further prevent exposure of the object to be coated 11 and increase the lifespan of the piston 20 coated by the multilayer lubrication coating composition.

Second Embodiment

Next, a second embodiment of the present invention will be will be described with reference to the accompanying drawings.

First, an object to be coated 11 made of an aluminum alloy is anodized as shown in FIG. 3(a).

Specifically, a plate 27 made of carbon contacts a cathode 12, the object to be coated 11 contacts an anode 13, and these components are immersed in an electrolytic solution 28 inside a tank 16.

A current is charged to anodize the object to be coated 11 while immersed in the electrolytic solution 28.

For example, the electrolytic solution 28 may be a solution mixture of 65.6 g/L of tribasic sodium phosphate ($Na_3PO_4$) and 7.3 g/L of potassium fluoride (KF).

Anodizing may be carried out at a temperature of the electrolytic solution of 22° C., a voltage of 70 V, and a time of thirty minutes.

Besides this method, another desired method, such as anodizing while discharging plasma, may be used for anodizing. Specifically, any desired method may be selected provided that an anodized film 31 (FIG. 3(c)) is formed on the surface of the object to be coated 11.

After anodizing, an upper-layer coating composition is coated on the surface of a semi-finished part and calcined in the same manner as discussed with reference to FIG. 1.

This completes a piston 30 such as shown in FIG. 3(b).

As shown in FIG. 3(c), which is an expanded view of a region c of FIG. 3(b), anodizing is used to coat an anodized film (alumite: $Al_2O_3$) 31 as a lower-layer coating film on the object to be coated 11.

The anodized film 31 has a thickness t2 of 10 for example. This thickness t2 can be adjusted by modifying the conditions of the plating treatment shown in FIG. 3(a). The thickness t2 may be in a range of 5 μm to 20 μm.

The anodized film 31 has a Vickers hardness of Hv 250 to 400.

An aluminum-silicon (Al—Si) alloy, which is one type of an aluminum alloy and is often used in metal parts, has a Vickers hardness of Hv 70 to 140.

That is, the Vickers hardness of the anodized film 31, which is the lower-layer coating composition, is higher than the Vickers hardness of an aluminum alloy (Al—Si alloy).

A calcined upper-layer coating film 32 is formed on the upper surface of the anodized film 31. The anodized film 31 and the upper-layer coating film 32 comprise a multilayer lubrication coating film 33 covering the outer surface of the piston 30.

Fine irregularities 34 are formed on the surface of the anodized film 31. These fine irregularities 34 serve as an anchor to increase the adhesion between the anodized film 31 and the upper-layer coating film 32.

The following can be said of the piston 30 according to the second embodiment.

The lower-layer coating composition comprises an anodized film 31 (lower-layer coating film) having a higher Vickers hardness than the Vickers hardness of the object to be coated 11. The lower-layer coating composition comprising the anodized film 31 having a high Vickers hardness resists damage. By having the lower-layer coating composition resist damage, the object to be coated 11 is less likely to be exposed to damage. Preventing exposure of the object to be coated 11 can increase the lifespan of the piston 30 (metal part) covered by the multilayer lubrication coating composition.

The present inventors conducted experiments to confirm the effects of the present invention. These experiments are described below.

EXPERIMENTAL EXAMPLES

Experimental examples according to the present invention are described below. The present invention shall not be construed as being limited to the experimental examples. The experiments will be described with reference to Table 1.

TABLE 1

| | | Piston | | | | | | | |
|---|---|---|---|---|---|---|---|---|---|
| | | Lower-layer | Upper-layer | | | Conditions of experiment | | | |
| | | coating | coating | | | Speed | Time | Results | |
| Experiment | Base material | film | film | Engine | Sand | (rpm) | (hours) | Appearance | Assessment |
| 1 | Aluminum alloy | Epoxy resin, boron nitride, silicon nitride, | Epoxy resin, boron nitride, silicon nitride | Single-cylinder 160 cc general-purpose engine | JIS Z 8901 test powder | 3600 | 100 | Deep damage | Poor |
| 2 | | Anodized film | | | | | | Shallow damage | Good |
| 3 | | Iron plating film | | | | | | No damage | Excellent |

In Experiment 1, a piston was fabricated using a conventional technique.

Specifically, an aluminum alloy was used as a base material, and a lower-layer coating film was coated on the surface of this base material. The lower-layer coating composition of the lower-layer coating film was a mixture comprising an epoxy resin, boron nitride, and silicon nitride. This mixture was coated on the surface of the base material, then calcined.

After the lower-layer coating film had been applied, an upper-layer coating film was applied. The upper-layer coating composition of this upper-layer coating film was a mixture of an epoxy resin, boron nitride, and silicon nitride. This mixture was coated on the surface of the lower-layer coating film, then calcined.

The piston fabricated under these conditions was mounted in a single-cylinder 160 cc general-purpose engine for the purpose of the experiment.

JIS Z 8901 test powder, representing sand, was mixed into a lubricating oil before running the engine. The engine was run at 3600 rpm for 100 hours.

The engine was shut off and assessed by observing the appearance. In Experiment 1, deep damage occurred in the surface of the piston, which was assessed as poor.

In Experiment 2, a base material was coated with an anodized film. The other conditions were the same as in Experiment 1. Specifically, a piston was fabricated in Experiment 2 under the conditions discussed with reference to FIG. 3.

In Experiment 2, although shallow damage occurred in the surface of the piston, the damage was not serious enough to be a problem, so the piston was assessed as good.

In Experiment 3, a base material was coated with an iron plating film. The other conditions were the same as in Experiment 1. Specifically, a piston was fabricated in Experiment 3 under the conditions discussed with reference to FIG. 3.

In Experiment 3, no damage occurred in the surface of the piston, which was assessed as excellent.

Deep damage occurred in the surface of the piston in Experiment 1, in which the lower-layer coating film had the lowest Vickers hardness. No damage, however, occurred in the surface of the piston in Experiment 3, in which the lower-layer coating film had the highest Vickers hardness.

Thus, a multilayer lubrication coating film comprising the multilayer lubrication coating composition resists damage, and hence also resists damage in a piston coated with the multilayer lubrication coating film. When a piston with such resistance to damage is mounted in an internal combustion engine, the internal combustion engine can be advantageously used in a variety of environments.

Although used in the embodiments to coat a piston, the multilayer lubrication coating composition according to the present invention can also be used to coat other metal parts, and can freely be applied to other metal parts.

The multilayer lubrication coating composition according to the present invention is advantageous for coating a piston, and the piston of the present invention may be advantageously used in a general-purpose engine.

Obviously, various minor changes and modifications of the present invention are possible in light of the above teaching. It is therefore to be understood that within the scope of the appended claims the invention may be practiced otherwise than as specifically described.

What is claimed is:

1. A multilayer lubrication coating film formed on an outer surface of an object to be coated, the coating film comprising:
   a lower-layer coating film formed on the outer surface of an object to be coated; and
   an upper-layer coating film formed directly on a surface of the lower-layer coating film,
   wherein the upper-layer coating film is formed using a composition made of 50 to 70 mass % of at least one of an epoxy resin and a polyamide-imide resin as bonding resins, 5 to 20 mass % of boron nitride as a solid lubricant, and 15 to 30 mass % of at least one of silicon nitride and alumina as hard particles,
   wherein the lower-layer coating film has a Vickers hardness higher than a Vickers hardness of the object to be coated for protection of the outer surface of the object to be coated against damage caused due to abrasion by a foreign matter acting as a grinding material penetrating through the upper-layer coating film, and
   wherein the object to be coated is made of an aluminum alloy, and the lower-layer coating film is an iron plated film.

2. A piston for an internal combustion engine, the piston having the multilayer lubrication coating film of claim 1 formed on an outer peripheral surface thereof.

* * * * *